No. 703,125. Patented June 24, 1902.
H. C. EMRICH.
MILK JAR OR BOTTLE.
(Application filed Sept. 28, 1901.)
(No Model.)
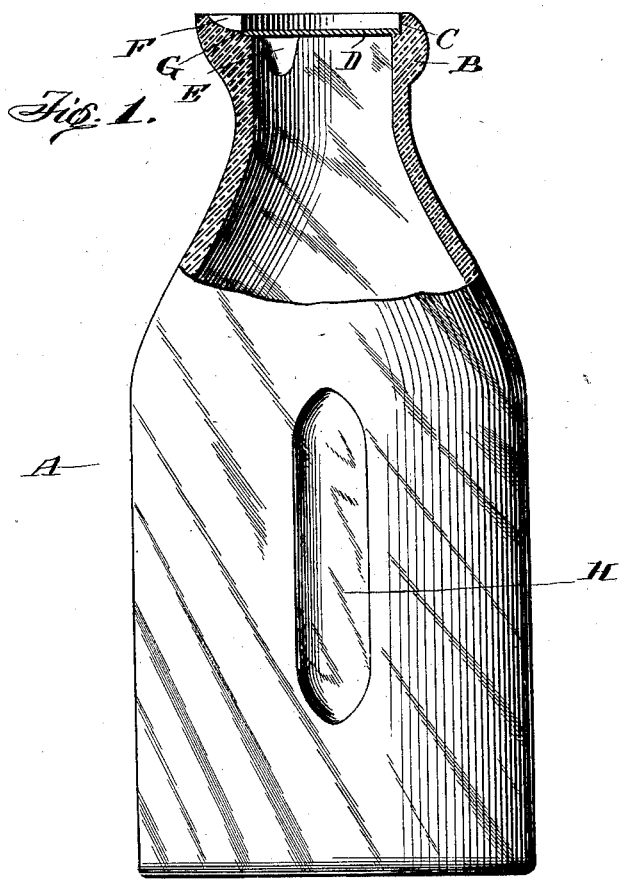
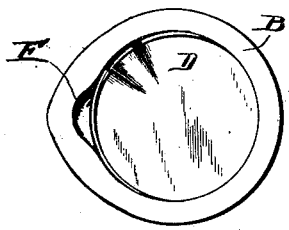
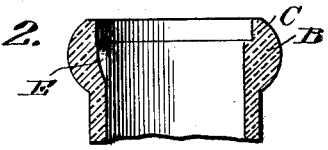
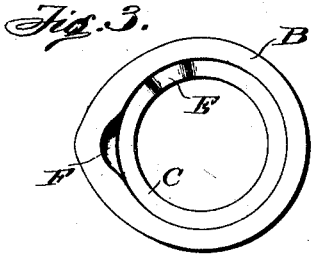
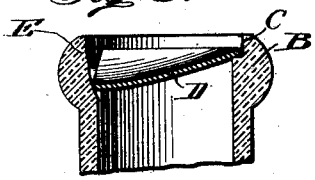
Witnesses
G. Howard Walmsley
N. A. Mayhew
Inventor
Henry C. Emrich
By James W. Bevans
His Attorney
THE NORRIS PETERS CO., PHOTO-LITHO., WASHINGTON, D. C.

UNITED STATES PATENT OFFICE.

HENRY C. EMRICH, OF WASHINGTON, DISTRICT OF COLUMBIA.

MILK JAR OR BOTTLE.

SPECIFICATION forming part of Letters Patent No. 703,125, dated June 24, 1902.

Application filed September 28, 1901. Serial No. 76,904. (No model.)

*To all whom it may concern:*

Be it known that I, HENRY C. EMRICH, a citizen of the United States, residing at Washington, in the District of Columbia, have invented a certain new and useful Improvement in Milk Jars or Bottles; and I do hereby declare the following to be a full, clear, and exact description of the invention, such as will enable others skilled in the art to which it appertains to make and use the same.

This invention relates to improvements in milk jars or bottles; and the object thereof is to so construct a jar or bottle of this class that the closing-disk employed to seal the same may be conveniently and readily removed without the use of a tool or other device.

A further object is to so construct a milk jar or bottle that the contents thereof may be poured therefrom without spilling and to provide the same with means whereby it may be conveniently held by the user during the pouring operation.

With the above objects in view the invention consists in the novel features of construction hereinafter fully described, particularly pointed out in the claims, and clearly illustrated by the accompanying drawings, in which—

Figure 1 is a view, partly in section and partly in elevation, of a bottle or jar constructed in accordance with my invention, the closing-disk being shown in position; Fig. 2, a sectional detailed view of the mouth of the bottle, said section being at right angles to the section shown in Fig. 1; Fig. 3, a top plan view of the mouth of the bottle or jar, the closing-disk being removed; Fig. 4, a similar view with the disk in position, showing the same when it has been operated preparatory to removal; and Fig. 5, a vertical section view of the mouth of the bottle or jar, showing the closing-disk in the same condition as shown in Fig. 4.

The preferred form of milk jar or bottle now in use consists of a bottle formed in the mouth thereof with a seat to receive a closing-disk of pasteboard, which is sprung into the seat or groove. This forms a very desirable bottle or jar, the closure being simple, cheap, sanitary, and capable of being easily applied. There are, however, serious objections to this construction, as while the closure is capable of being easily applied the removal of the same is exceedingly difficult, necessitating the use of a tool of some sort to effect said removal. In removing the disk by the use of a tool or metallic instrument the bottles are chipped, either ruining the same for further use or rendering them dangerous to handle. Also the milk is spilled by this prying of the disks from their seats, and much inconvenience is experienced. My improved bottle is designed to obviate these difficulties and also to provide an exceedingly convenient bottle from which the contents or a portion thereof may be poured, as from a pitcher, without spilling and wasting any portion thereof.

Referring now more particularly to the accompanying drawings, A designates a jar or bottle having the usual bead B, formed within an annular groove or seat C to receive the ordinary construction of pasteboard closing-disk D. Formed in the wall of the neck of the bottle below the closing-disk when the latter is in position is a recess or depression E, which at its upper end cuts through or intersects the seat C. The depression or recess at its upper end is as deep as the width of said seat, but tapers at its lower end into the inner diameter of the bottle's mouth or neck. The side walls of said recess or depression E where they join the seat or flange C are rounded, so as not to present a sharp or abrupt surface.

The upper portion of the bead B of the jar is enlarged laterally at a point to one side of the depression or recess E and is formed with a recess or depression F, the bottom wall of which tapers downwardly and inwardly to a point above the seat for the closing-disk, so that when said disk is in position it is provided with shoulder G at said recess F. Thus the liability of leakage is prevented, which would not be the case were the bottom wall of said recess F in the same plane as the seat for the closing-disk, in which event there would be a tendency for the milk to pass around the disk at this point, and hence leak from the bottle. This lateral enlargement of the bead B and the recess F formed therein constitutes a spout to facilitate the pouring of the milk from the bottle and also coacts with the recess E in effecting the removal of the disk, as will be more fully set forth. With the disk in position, as shown in Fig. 1, to effect the removal of the same from the bottle it is only necessary to press upon the upper surface thereof with the finger, so as to force the disk downwardly at that point into the depression E, when one corner thereof will be raised slightly at the depression F, as clearly illustrated in Figs. 4 and 5. The thumb is then inserted beneath the raised corner of the disk at the depression or spout F and said disk readily removed from the bottle. It will thus be seen that the disk can be readily removed from the bottle by the use of two fingers of the user, one finger to press the disk downwardly at the point E and the other to insert beneath the raised portion thereof at the point F. While the spout or recess F facilitates the removal of the disk, yet the same is not essential, as the edge of the disk would be raised sufficiently to enable it to be grasped by the thumb of the user even if said recess F were omitted. By the use of the spout the milk may be conveniently poured from the bottle without spilling or dripping, and to facilitate the handling of the bottle in effecting said pouring I have provided the body thereof on opposite sides of its circumference with longitudinally-extending depressions or niches H to receive the fingers and thumb of the user.

In removing the disk it is necessary to press the same but a slight distance inwardly, and hence the recess E is very small. Thus the disk is not pressed far enough into the bottle to cause the milk to be splashed therefrom, so that there is no waste or loss.

Having thus fully described my invention, the improvements I claim as new, and desire to secure by Letters Patent of the United States, are—

1. A bottle or jar having a disk-receiving seat formed upon the interior of the mouth thereof, and in the inner side of the wall of the mouth with a depression cutting through said seat and disposed below the same for the purpose substantially set forth.

2. A bottle or jar having an annular disk-receiving seat formed upon the interior of the mouth thereof, and a depression in the inner side of the wall of the mouth thereof, disposed below the seat, substantially as described.

3. A bottle or jar having an annular disk-receiving seat formed upon the interior of the mouth thereof, a depression cutting said seat and disposed below the same, and a depression formed in the upper edge of the mouth and extending inwardly to a point above said seat, substantially as described.

4. A jar or bottle formed with a horizontally-disposed annular seat upon the inner side of its mouth, and a recess having its upper end cut through said seat, and tapering at its lower end into the inner diameter of the mouth, substantially as described.

5. A bottle or jar having an annular disk-receiving seat formed upon the interior of the mouth thereof, a depression formed in the inner wall of said mouth and cutting the seat and extending below the same, and a depression formed in the upper edge of the mouth and extending inwardly to said seat, substantially as described.

In testimony whereof I affix my signature in the presence of two witnesses.

HENRY C. EMRICH.

Witnesses:
JAMES W. BEVANS,
G. W. DREW.